United States Patent [19]

Higashihara et al.

[11] Patent Number: 5,260,927
[45] Date of Patent: Nov. 9, 1993

[54] OPTICAL PICKUP DEVICE FOR RECORDABLE DISC AND DICHROIC MIRROR

[75] Inventors: Teruaki Higashihara, Tokyo; Yoji Ishii, Kanagawa; Kiyoshi Ohsato, Chiba, all of Japan

[73] Assignee: Sony Corporation, Tokyo, Japan

[21] Appl. No.: 816,733

[22] Filed: Jan. 3, 1992

[30] Foreign Application Priority Data

Jan. 9, 1991 [JP] Japan .................. 3-11633

[51] Int. Cl.⁵ ............................ G11B 7/00
[52] U.S. Cl. ............................. 369/110
[58] Field of Search ................... 369/110, 13

[56] References Cited

U.S. PATENT DOCUMENTS

| | | | |
|---|---|---|---|
| 4,502,762 | 3/1985 | Anderson | 369/44.37 |
| 4,549,287 | 10/1985 | Hatano et al. | |
| 4,771,414 | 9/1988 | Yoshimatsu | 369/110 |
| 4,905,215 | 2/1990 | Hattori et al. | 369/114 |
| 4,965,780 | 10/1990 | Lee et al. | 369/110 |
| 5,068,843 | 11/1991 | Takeshita et al. | 369/44.27 |
| 5,132,959 | 7/1992 | Ishika | 369/110 |

FOREIGN PATENT DOCUMENTS

0056920 8/1982 European Pat. Off.

OTHER PUBLICATIONS

Patent Abstracts of Japan, vol. 8, No. 163, (P-290) [1600], Jul. 27, 1984; and JP-A-59 058 638 (Nippon Denki K.K.) Apr. 4, 1984.
Patent Abstracts of Japan, vol. 13, No. 422 (P-933), Sep. 20, 1989; and JP-A-1 154 326 (Fujitsu Ltd.) Jun. 16, 1989.
Patent Abstracts of Japan, vol. 13, No. 454 (P-944), Oct. 13, 1989; and JP-A-1 176 339 (Nec Home Electron. Ltd.) Jul. 12, 1989.
Patent Abstracts of Japan, vol. 7, No. 90 (P-191), Apr. 14, 1983; and JP-A-58 017 546 (Olympus Kogaku Kogyo K.K.) Feb. 1, 1983.
Patent Abstracts of Japan, vol. 12, No. 86 (P-677) Mar. 18, 1988; and JP-A-62 219 241 (Oki Electric Ind. Co., Ltd. (Sep. 26, 1987).

Primary Examiner—Bruce C. Anderson
Attorney, Agent, or Firm—William S. Frommer; Alvin Sinderbrand

[57] ABSTRACT

Laser light beams from first and second laser light sources 11 and 12 having different wavelengths are synthesized by a dichroic mirror 16 and irradiated on a magneto-optical disc 20 as a recordable disc and the reflected light is separated into the laser light of the first and second wavelengths. In respect of the laser light of the first wavelength, the phase difference between the P- and S-polarization components produced by the dichroic mirror 16 is compensated by a phase compensation plate 32 and the P- and S-polarization components are separated from each other by a polarization beam splitter 36 so as to be received by photodetector elements 37 and 38, respectively. Such dichroic mirror 16 is used in which the difference between the minimum transmittance in a working range of the laser light of the first wavelength and the maximum transmittance in a working range of the laser light of the second wavelength is 90% or higher for reducing changes in the phase difference between the P- and S-polarization components. Optimum signals may be obtained at the photodetector elements 37 and 38 while high wavelength separation characteristics are maintained.

2 Claims, 9 Drawing Sheets

OPTICAL PICKUP DEVICE FOR RECORDABLE DISC AND DICHROIC MIRROR

BACKGROUND OF THE INVENTION

1. Field of the Invention

This invention relates to an optical pickup device for a recordable disc, such as a magneto-optical disc, and a dichroic mirror employed in such optical pickup device. More particularly, it relates to an optical pickup device for a recordable disc employing two laser light beams of different wavelengths, and a dichroic mirror employed in such optical pickup device for separating the light beams with different wavelengths.

2. Description of Related Art

In a tape recorder or the like, among a variety of signal recording apparatus, which is employed for professional applications in, for example, recording studios, it becomes necessary to perform pre-reading to effect synchronous recording or post-reading to effect monitoring of recording. With conventional tape recorders for professional applications, a playback head, a recording head and a second playback head are placed in this order, or a recording head, a playback head and a recording head are arranged in this order in order to enable such pre-reading or post-reading. On the other hand, in a recording apparatus for a recordable disc, such as a magneto-optical disc, it has been contemplated to use two pickup devices in an optical system associated with one of the disc sides, with one of the pickup devices taking charge of signal recording and the other pickup device taking charge of signal reproduction. However, since the use of the two pickup devices complicates system implementation, it has also been contemplated to make use of two laser light beams with different wavelengths, which are synthesized by a dichroic mirror to produce a sole laser light beam which is irradiated by means of an object lens on the disc as plural light spots or so-called multi-spots, with the reflected light being separated into laser light beams of the different wavelengths by means of the dichroic mirror or an interference filter to effect pre-reading or post-reading.

Although it would be highly effective to form such multi-spots on the disc by means of the sole object lens from the laser light beams of the two wavelengths, it may be feared that, if the light beams of the two different wavelengths cannot be separated positively from each other, the laser light beams will leak into each other at the photodetector elements, so that satisfactory signals cannot be obtained. On the other hand, with the use of the magneto-optical disc as the recordable disc, since the small Kerr rotation angle is taken out as an electrical signal, satisfactory signals cannot be obtained as a result of de-phasing of the P-polarized light component or the S-polarized light component.

Figure 10:
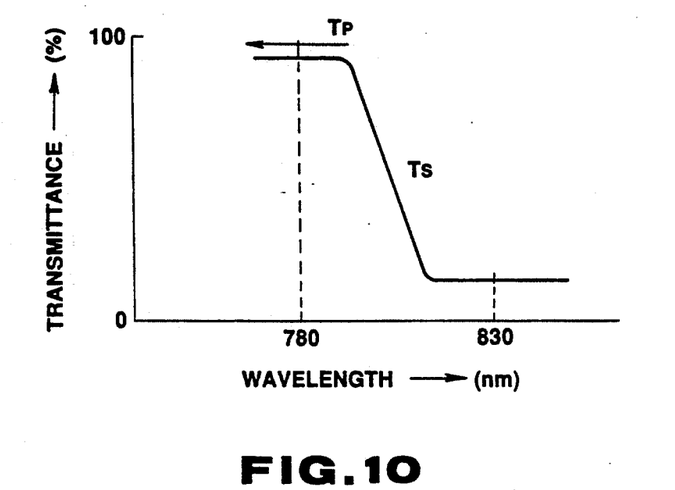
FIG. 10 is a graph showing transmittance characteristics of a dichroic mirror with respect to wavelength.
Figure 11:
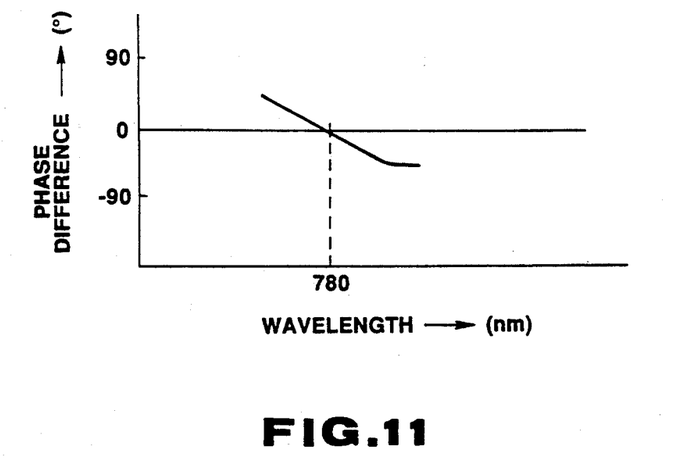
FIG. 11 is a graph showing transmission phase difference characteristics of a dichroic mirror with respect to wavelength.

If the wavelengths of 780 nm and 830 nm are selected as specific examples of the two wavelengths of the laser beams, and detection of photomagnetic signals is performed at the side of the return beam of the wavelength of 780 nm on the basis of the difference between the P-polarized light component and the S-polarized light component, a dichroic mirror used for separating the light beams of the respective wavelengths has transmittance characteristics with respect to the wavelength as shown, for example, in FIG. 10 and phase difference characteristics between the P-polarized light component and the S-polarized light component with respect to the wavelength as shown, for example, in FIG. 11

That is, since photomagnetic signal detection is performed by the return laser beam of the wavelength of 780 nm, the dichroic mirror should have the phase difference characteristics shown in FIG. 11, in which the phase difference becomes zero in the vicinity of 780 nm.

Figure 12:
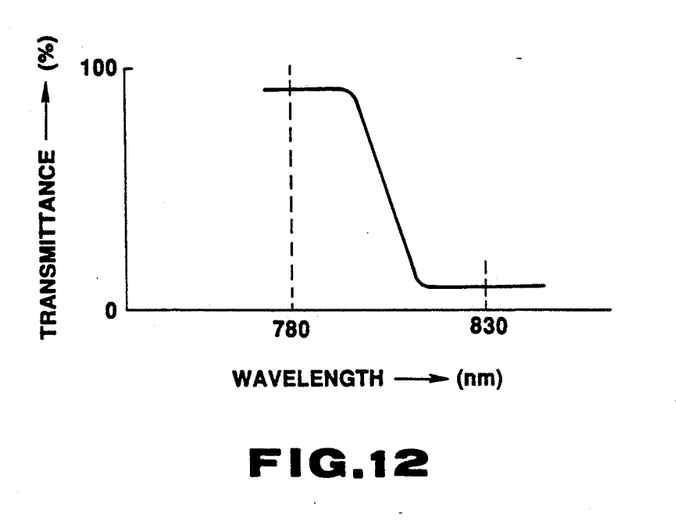
FIG. 12 is a graph showing transmittance characteristics of an interference filter with respect to wavelength.
Figure 13:
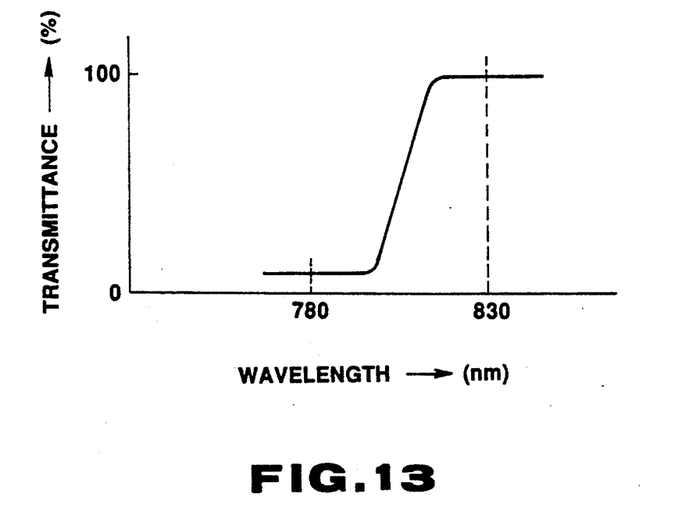
FIG. 13 is a graph showing transmittance characteristics of an interference filter with respect to wavelength.

Meanwhile, if a semiconductor laser with a wavelength of 780 nm or 830 nm is employed, a separation bandwidth of the order of 30 nm is necessitated in order to take account of fluctuations of the laser oscillation wavelengths, shifting in wavelengths due to temperature changes or widening of the wavelengths due to superimposed high harmonics. It is however extremely difficult to separate the two wavelengths completely while maintaining the zero phase difference in the vicinity of the wavelength of 780 nm. For this reason, it has been customary to provide an interference filter having wavelength-transmittance characteristics as, for example, shown in FIG. 12 in a return beam path of the laser light having a wavelength of 780 nm and to provide another interference filter having wavelength-transmittance characteristics as, for example, shown in FIG. 13 in a return beam path of the laser light having a wavelength of 830 nm to improve wavelength separation characteristics. However, the return light of the laser light of one of the wavelengths reaching the interference filter provided in the return beam path of the laser light of the other wavelength for elimination thereby is diminished in light volume because of the incomplete wavelength separation by the dichroic mirror. Although it may be contemplated to provide a large gap between the two wavelengths for a more complete wavelength separation, the object lens needs to be of higher performance, thus leading to elevated costs.

OBJECTS AND SUMMARY OF THE INVENTION

In view of the above depicted status of the art, it is an object of the present invention to provide an optical pickup device for a recordable disc in which laser light beams of two wavelengths, after having been irradiated on the disc with a plurality of beam spots, may be separated more completely into the laser light beams of the original wavelengths.

It is another object of the present invention to provide an optical pickup device for a recordable disc in which the phase difference between the P-polarization component and the S-polarization components of one of the two wavelength light beams may be easily reduced to zero.

It is a further object of the present invention to provide a dichroic mirror employed in such optical pickup device.

For accomplishing the above objects, the present invention provides an optical pickup device for a recordable disc comprising a first laser light source for radiating a laser light of a first wavelength, a second laser light source for radiating a laser light of a second wavelength, a dichroic mirror for synthesizing the laser lights from said first and second laser light sources for irradiating said recordable disc with a laser light synthesized from said laser lights, said dichroic mirror separating a return light from said disc into a first return light with said first wavelength and a second return light with said second wavelength, phase compensation means for compensating a phase difference between a P-polarization component and an S-polarization component of at least one of the first and second return lights produced by said dichroic mirror, a polarization beam splitter for separating a laser light from said phase compensation means into a P-polarization component and an S-polarization component, and light receiving means for receiving the P-polarization component and the S-polarization component from said polarization beam splitter.

The present invention also provides a dichroic mirror for separating a laser light of a first wavelength and a laser light of a second wavelength from each other, wherein the difference between the minimum transmittance in a working range of the laser light of the first wavelength and the maximum transmittance in a working range of the laser light of the second wavelength is 90% or higher, changes in the phase difference between the P- and S-polarization components are diminished, and wherein the phase difference between the P-polarization component and the S-polarization component is compensated by another optical component.

With the optical pickup device for a magneto-optical disc of the present invention, first and second laser light beams of different wavelengths are used, in which the first laser beam is divided into plural beams which are synthesized with the second laser beam by a dichroic mirror and irradiated on the recordable disc. The reflected light from the disc is separated by the dichroic mirror into laser light beams of the first and second wavelengths and, in respect of at least one of the return light beams, the phase difference between the P-and S-polarization components is compensated by a phase compensation unit. The laser light from this unit is separated into P- and S- polarization components which are detected separately to produce optimum signals by reducing the phase difference between the polarization components to zero while maintaining high wavelength separation characteristics.

With the dichroic mirror of the present invention for separating laser light beams of first and second wavelengths, the difference between the minimum transmittance in a working range of the laser light of the first wavelength and the maximum transmittance in a working range of the laser light of the second wavelength is 90% or higher for reducing changes in the phase difference between the P- and S-polarization components. The phase difference is compensated by another optical component for reducing the phase difference between the P- and S- polarization components to zero while high wavelength separation characteristics are maintained. Optimum signal detection may be achieved when the dichroic mirror is used in an optical pickup in which laser beams of two different wavelengths are used and the difference between the P- and S- polarization components is detected in respect of one of the laser beams.

With the present dichroic mirror, optimum light detection signals may be achieved by compensating the phase difference produced at the time of wavelength separation by phase compensation means.

DESCRIPTION OF PREFERRED EMBODIMENT

Preferred embodiments of an optical pickup device for a recordable disc and a dichroic mirror according to the present invention will now be explained in detail with reference to the accompanying drawings.

Figure 1:
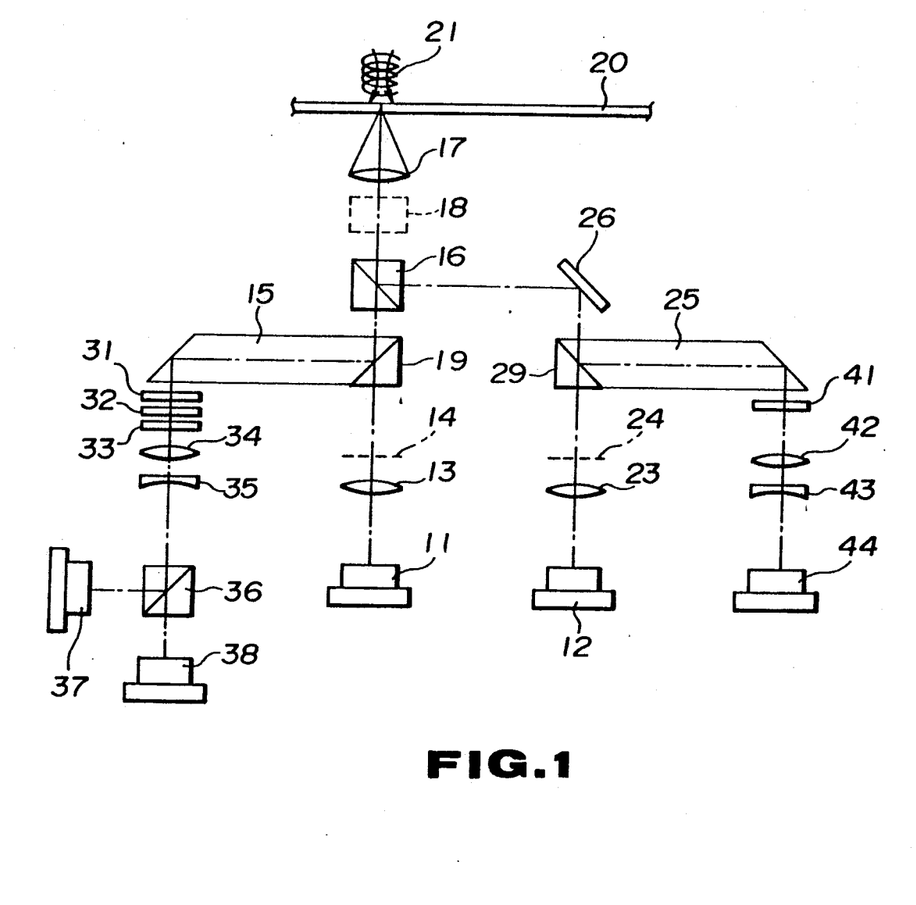
FIG. 1 is a schematic view showing an arrangement of an optical pickup device for a recordable disc according to an embodiment of the present invention.

FIG. 1 schematically shows an optical system according to an embodiment of the present invention. In this figure, two laser light sources 11 and 12 are adapted for radiating laser light beams of different wavelengths. For example, the laser light source 11 may be a semiconductor laser radiating a laser beam with a wavelength of 780 nm for reading and the laser light source 12 may be a semiconductor laser radiating a laser light with a wavelength of 830 nm for recording. The readout laser light from the light source 11 with the wavelength of 780 nm is collimated by a collimator lens 13 and diffracted by a grating 14 so as to be split into three laser beams which are transmitted through a beam splitter 15 before being incident on an object lens 17 by means of a dichroic mirror 16. A 45° mirror 18 may occasionally be provided between the dichroic mirror 16 and the object lens 17 for bending the light path of the laser beam in an orthogonal direction depending on the necessity imposed by the specific arrangement of optical components. The laser light from the object lens 17, occasionally after reflection by the object lens 17, is irradiated on the recordable disc, such as a magneto-optical disc 20.

The recording laser light from the laser light source 12, with the wavelength of 830 nm, is collimated by a collimator lens 23 and diffracted by a grating 24 so as to be split into three light beams. These light beams are transmitted through a beam splitter 25 so as to be incident on the dichroic mirror 16 after reflection by a driving mirror 26. The laser light beams with the wavelength of 830 nm are reflected by the dichroic mirror 16 and occasionally reflected by the 45° mirror 18 to be irradiated on the magneto-optical disc 20 by -means of the object lens 17. By this recording laser light of the wavelength of 830 nm, the site of an irradiated spot on the magneto-optical disc 20 is locally heated to a temperature higher than the Curie temperature and magnetized in the direction of a magnetic field applied by a magnetic head 21 disposed at a corresponding position on the opposite side of the magneto-optical disc 20.

Figure 2:
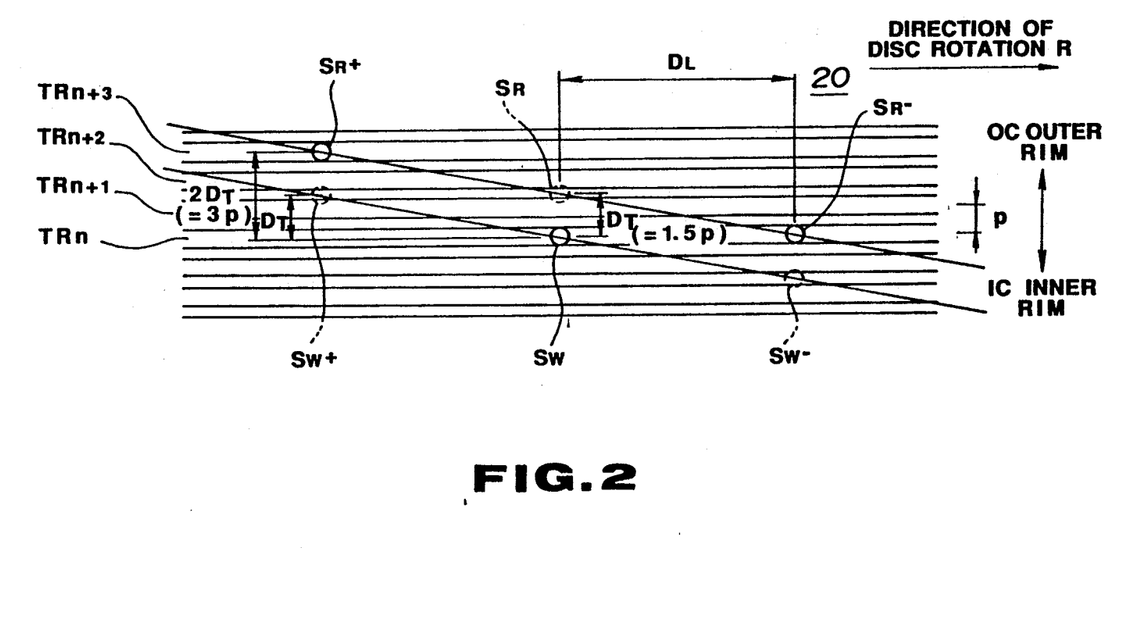
FIG. 2 is a schematic plan view showing laser light spots on the recordable disc.

FIG. 2 shows, in a schematic plan view, the relative position of laser beam spots on the magneto-optical disc 20. Among a number of recording tracks TR, formed spirally or concentrically in a side-by-side relation with a track pitch P, a track on which a spot $S_w$ of the recording laser beam with the wavelength of 830 nm is formed, is termed $TR_n$. If, from this currently recorded track $TR_n$ towards the outer rim of the disc, in a direction indicated by arrow OC, the tracks are sequentially termed $TR_{n+1}$, $TR_{n+2}$, $TR_{n+3}$, ..., the laser beam spot of the reading laser light with the wavelength of 780 nm is spaced apart from the spot $S_w$ by a predetermined distance $D_T$ (= 1.5 p in the example of FIG. 2) towards the outer rim of the disc, that is in the direction shown by arrow OC. As a specific example, $D_T = 2.4$ pm for a track pitch p of 1.6 µm.

It is noted that the light spots by the diffracted light by the gratings 14 or 24, such as the 0'th order light or the ±1st order light, are formed on a straight line inclined with respect to the track direction or the direction of disc rotation R. Specifically, light spots $S_{R+}$ and $S_{R-}$ or $S_{W+}$ and $S_{W-}$ are formed at a predetermined distance $D_L$ forwardly and rearwardly, respectively, in the scanning sequence along the track direction or the direction of disc rotation R, and by the above distance $D_T$ towards the outer rim of the disc indicated by arrow OC and towards the inner rim of the disc indicated by arrow IC, respectively, along the track width. In the example of FIG. 2, $D_T = 1.5$ p. Since the light spot $S_R$ by the reading 0'th order light is deviated towards the outer rim of the disc as shown by arrow OC with respect to the light spot $S_W$ by the recording 0'th order light, the light spot $S_{R-}$ by the reading −1st order light is spaced apart from the light spot $S_W$ rearwardly on the same recording track $TR_n$ as that of the light spot $S_W$ by the above mentioned distance $D_L$. On the other hand, the light spot $S_{R+}$ by the reading +1st order light is spaced apart from the light spot $S_W$ forwardly by the distance $D_L$ on a recording track $TR_{n+3}$ offset by $2D_T$ (= 3 p) from the light spot $S_W$.

The grating 14 for diffracting the laser light of the wavelength of 780 nm is preferably of such a diffracted light volume ratio which will give a smaller diffracted light volume for the 0'th order light and a larger diffracted light volume for the ±1st order light. For example, a grating which will give a diffracted light volume ratio of 20% for the 0'th order light and 30% for each of the ±1st order light, is employed. The grating 24 for diffracting the laser light of the wavelength of 830 nm is preferably of such a diffracted light volume ratio which will give a larger diffracted light volume for the 0'th order light and a smaller diffracted light volume for the ±1st order light. For example, a grating which will give a diffracted light volume ratio of 85% for the 0'th order light and 5.5 to 7% for each of the ±1st order light, is employed. From the six light spots by these diffracted light beams, the light spots $S_{R+}$ and $S_{R-}$ of the ±1st light with the light volume ratio of 30% are used for reading and the light spot $S_W$ of the 0'th order light with the light volume ratio of 85% is used for recording.

It is noted that when the recording light spot $S_W$ is formed on the track $TR_n$, one of the reading light spots $S_{R+}$ is formed at a position on the track $TR_{n+3}$ offset by three tracks from the track $TR_n$ which is spaced forwardly by the aforementioned distance $D_L$ from the light spot $S_W$, while the other reading light spots $S_{R-}$ is formed at a position on the same track $TR_n$ which is spaced rearwardly by the same distance $D_L$. Since the recording/reproducing head scans the tracks from the inner rim towards the outer rim of the disc, the reading light spot $S_{R+}$ reads data ahead of recording by three tracks plus the distance $D_L$, while the other reading light spot $S_{R-}$ reads data after recording by the above distance $D_L$. This distance $D_L$ calculated so as to allow sufficient time to elapse since the portion of the recording medium heated by the light spot $S_W$ for recording is cooled to permit a magnetic domain to be formed thereat. As a specific example, a value of the distance $D_L = 23$ µm is sufficient even on deduction of the distance by which the recording medium is moved until the formation of the magnetic domain.

Figure 3:
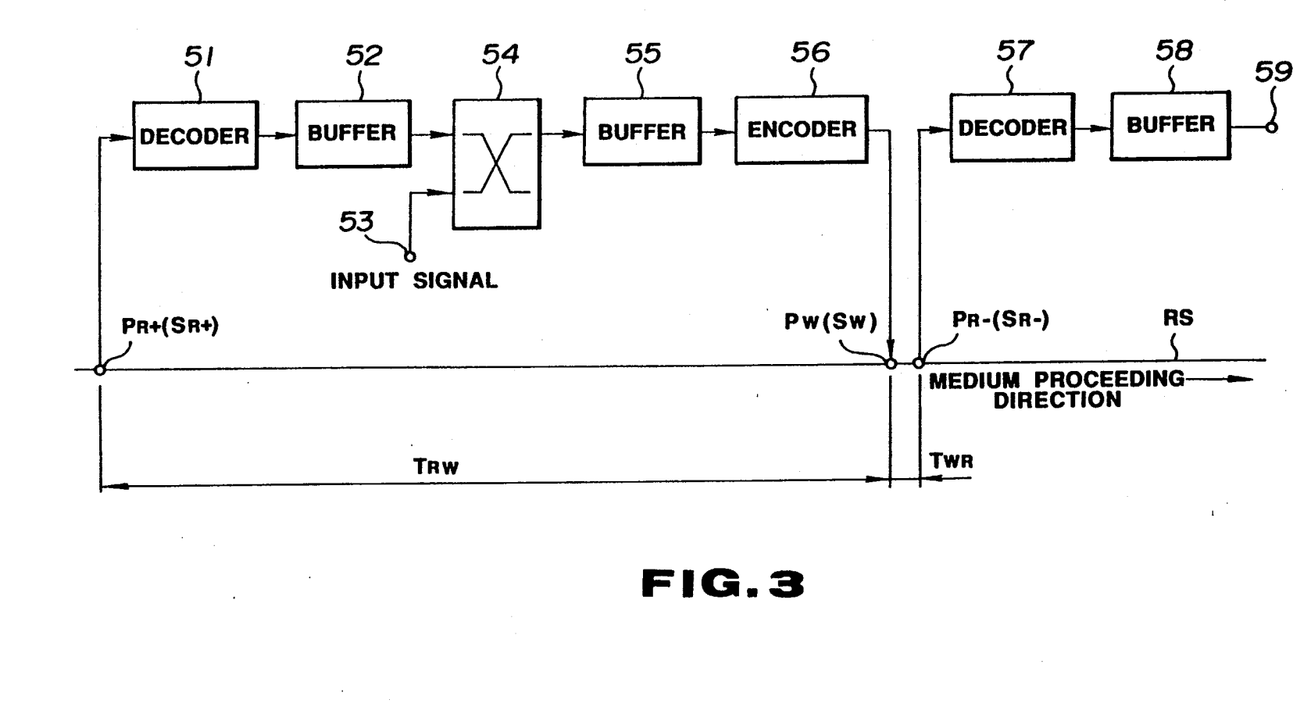
FIG. 3 is a schematic block diagram showing a prerecording position and a post-recording position on the recordable disc with respect to a recording position, and relative timing therebetween.

FIG. 3 is the timing chart for illustrating the relative timing for synchronous recording and monitoring of recording. The timing chart illustrates signal flow and relative positions for pre-reading, recording and post-reading with respect to a recording line RS indicating various signals recorded on the recording medium, such as a magneto-optical disc, in the chronological sequence. Referring to FIG. 3, the recorded signal read at a predetermined pre-reading position $P_{R+}$, which corresponds to the light spot $S_{R+}$, is transmitted to a decoder 51 where it is converted into a string of digital data, such as a string of audio signal data, by being processed by decoding operations, such as RF demodulation, deinterleaving, error detection or error correction. The output audio signal data from the decoder 51 are transmitted to and sequentially written in a buffer 52 from which they are read and supplied to a cross-fader 54 in a timed relation to a string of audio signal data supplied to an input terminal 53. The data string from the buffer 52 and the data string from input terminal 53 are processed at the cross-fader 54 by cross-fading whereby the former data string is gradually decreased in signal strength (faded-out) and the latter data string is gradually increased in signal strength (faded-in) before the two data strings are transmitted to a buffer 55. The data string from buffer 55 is turned into recording signals by being processed with encoding operations such as interleaving, error correction coding or RF demodulation, before being recorded at a predetermined recording position $P_W$ on the recording line RS corresponding to the light spot $S_W$. The recorded signals are again read at a predetermined post-reading position $P_{R-}$ at the rear of the recording position $P_W$ so as to be decoded by a decoder 57 before being taken out as a string of digital data, such as a string of audio signal data, at an output terminal 59 by means of a buffer 58. The recording contents are collated by comparing the output from the buffer 58 and the output from the cross-fader 54.

Referring to FIG. 3, it is necessary to effect signal reading in advance of signal recording by a time period $T_{RW}$, which corresponds to the signal processing from decoder 51 to encoder 56, in order to achieve synchronized recording and monitoring of recording. This signal processing time $T_{RW}$ corresponds to about two revolutions at the innermost disc rim, if only the decoding and encoding operations should be performed. For this reason, in the present embodiment, the pre-reading spot $S_{R+}$ is arranged in advance of the writing spot $S_W$ by a time corresponding to three tracks or three disc revolutions plus the aforementioned distance $D_L$. The time difference $T_{WR}$ between the recording position $P_W$ and the post-reading position $P_{R-}$ corresponds to the time necessary for disc movement (head scanning) through the distance $D_L$ shown in FIG. 2.

Figure 4A:
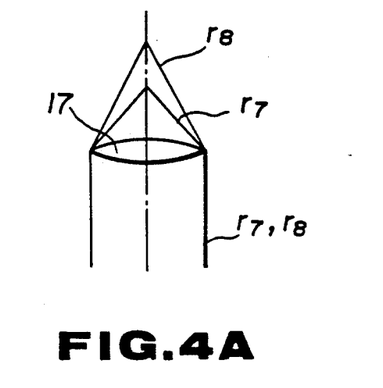
FIGS. 4A and 4B are diagrammatic views showing the states of convergence by an object lens of laser lights of different wavelengths.
Figure 4B:
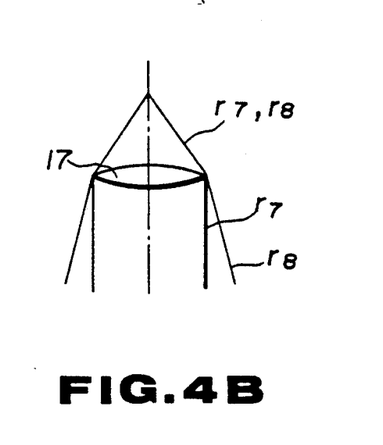

Meanwhile, if the incident laser light beams on the object lens 17 with the wavelengths of 780 nm and 830 nm are collimated beams, these beams are converged at different focal points, as shown in FIG. 4A for the laser light beams $R_7$ and $R_8$, with the laser light beam with the wavelength of 830 nm being converged at a further point. These beams may be converged at the same focal point if an achromatic lens is used as the object lens 17. However, the achromatic lens is generally expensive and will thus raise production costs. For this reason, the collimator lens 23 is moved-forwardly in the present embodiment to effect focusing at the same point. That is, if the collimator lens 23 is moved forwardly, the incident laser light beam $R_8$ at the object lens 17 with the wavelength of 830 nm is converged as shown in FIG. 4B, to form a focal point at a position closer to the lens 17, so that, even although an ordinary object lens 17 other than an achromatic lens is used, the laser beam may be focused at the same point as that of the collimated incident laser beam with the wavelength of 780 nm.

The light reflected from the magneto-optical disc 20 is occasionally reflected by the 45° mirror 18 so as to be incident on the dichroic mirror 16 by means of the object lens 17. The reading laser light, that is, the pre-reading and post-reading laser light, with the wavelength of 780 nm, is transmitted through the dichroic mirror 16, whereas the writing laser light with the wavelength of 830 nm is reflected by the dichroic mirror 16, thereby performing a wavelength separating operation.

Figure 5:
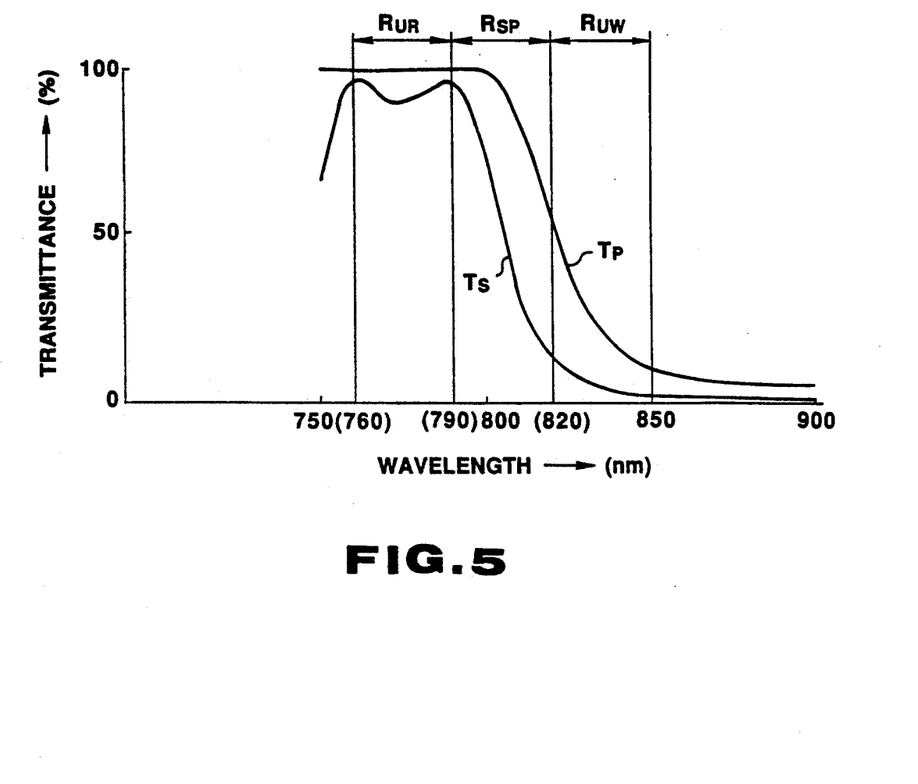
FIG. 5 is a graph showing transmittance characteristics of a dichroic mirror with respect to wavelength.
Figure 6:
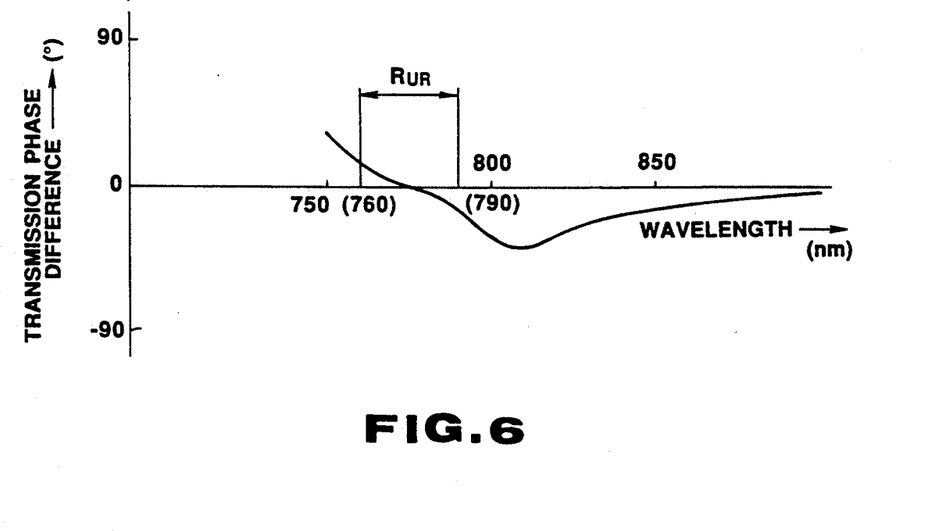
FIG. 6 is a graph showing transmission phase difference characteristics of a dichroic mirror with respect to wavelength.

The dichroic mirror 16 may have transmittance characteristics as shown for example in FIG. 5 and transmission phase difference characteristics as shown in FIG. 6. In these figures, a wavelength range $R_{UR}$ between 760 nm and 790 nm is a working range for the reading laser light with the wavelength of 780 nm, while a wavelength range $R_{UW}$ between 820 nm and 860 nm is a working range for the recording laser light with the wavelength of 830 nm, with a region of 30 nm between the wavelengths of 790 and 820 nm therebetween being used as a separating region. This separating region allows for fluctuations in laser oscillation wavelengths, wavelength shifting due to changes in temperature or widening of the wavelength due to superposition of harmonics. In FIG. 5, $T_P$ stands for transmittance of the P-polarization component, and $T_S$ stands for transmittance of the S-polarization component. In FIG. 6, a solid-line curve stands for phase difference between these P-and S-polarization components (P-polarization component minus S-polarization component). It is, however, difficult to completely separate the laser light beams of the respective wavelengths with a phase difference of 0° in the wavelength separating region $R_{SP}$, such that the light volume supplied to the photodetector for the desired wavelength is diminished while the light volume leaked into the optical system of the irrelevant wavelength is increased.

Figure 7:
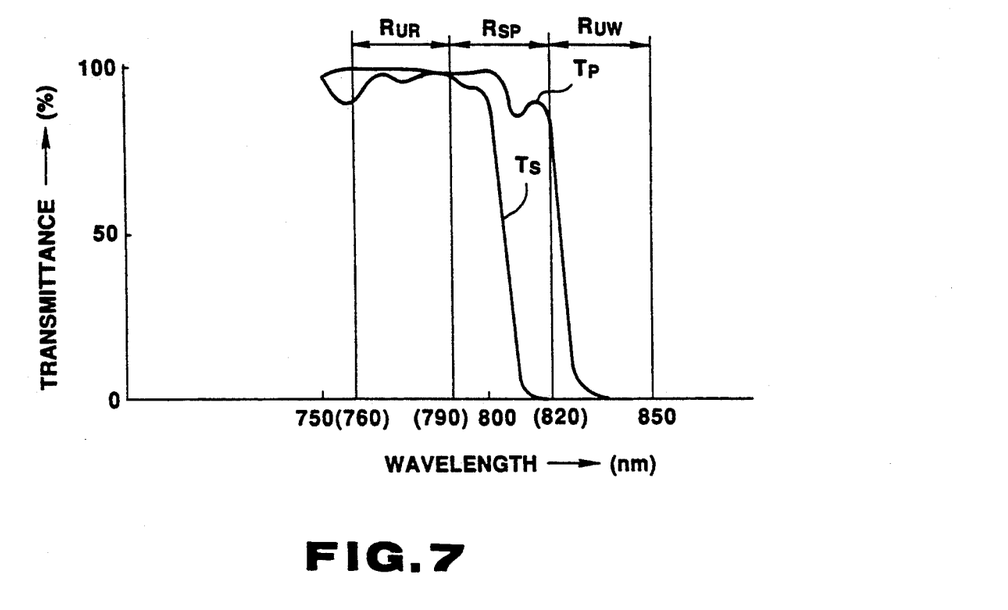
FIG. 7 is a graph showing transmittance characteristics of a dichroic mirror with respect to wavelength.
Figure 8:
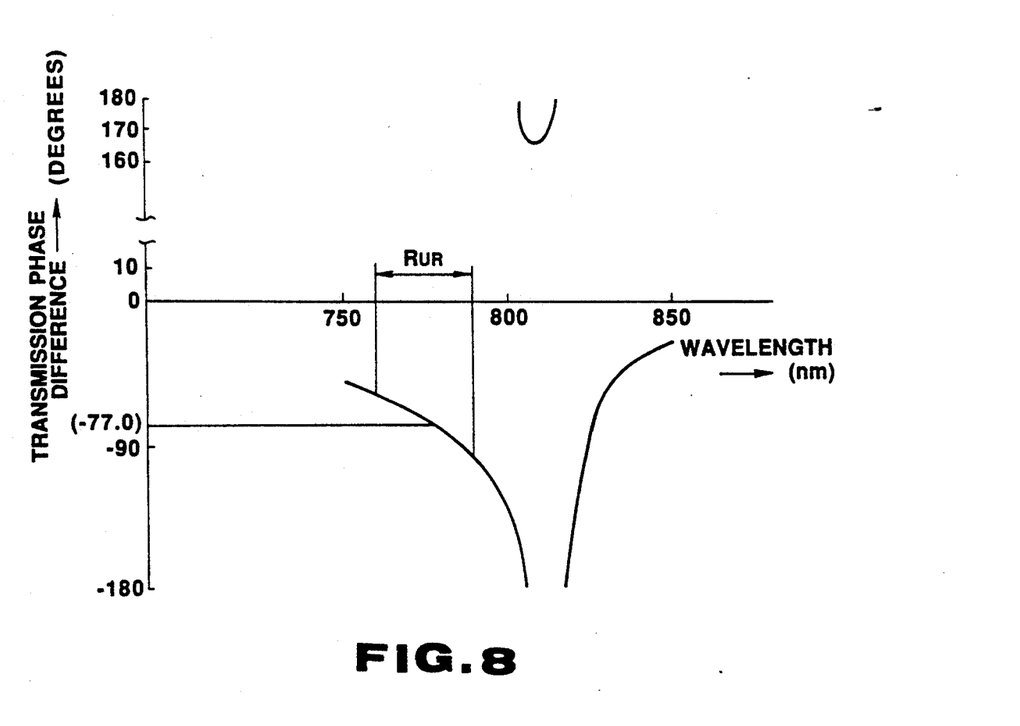
FIG. 8 is a graph showing transmission phase difference characteristics of a dichroic mirror with respect to wavelength.

With this in view, the dichroic mirror 16 having transmittance characteristics which will enable complete separation of the respective wavelengths as shown in FIG. 7 is employed, and a phase compensation plate is used for compensating the phase difference other than 0, such as 77.0° on an average, as shown in the transmission phase difference characteristics shown in FIG. 8. A phase difference of 0° may ultimately be realized by utilizing wavelength separation and compensating for the phase difference by the phase compensating plate which is a separate optical component.

The laser light transmitted through the dichroic mirror 16 then is incident on the beam splitter 15 where it is reflected twice on a wavelength separating film surface and on an inclined end face in the present embodiment. The laser light from the beam splitter 15 is transmitted if necessary through an interference filter 31, a phase compensation plate 32 and a ½ wavelength plate 33 before being incident on a condenser lens 34 and a composite lens 35. The phase compensation plate 32 is intrinsically used for compensating the phase shifting of approximately 38° produced by the reflection on the inclined end face of the beam splitter 15. However, if the dichroic mirror 16 having optical characteristics as shown in FIGS. 7 and 8 is employed, as explained previously, the phase compensation plate is simultaneously employed for compensating the phase difference shown in FIG. 8. In short, the phase compensation plate 32 is used for simultaneously compensating the phase shifting produced at the inclined end face of the beam splitter 15° and the transmission phase difference of 77° of the dichroic mirror 16 so that the phase difference will be ultimately reduced to zero. In this case, wavelength separation is performed fully satisfactorily at the dichroic mirror 16 so that the interference filter 31 and the interference filter 41 for the optical system of 830 nm may be eliminated to simplify the overall construction. The composite lens 35 may be composed of a concave lens for focusing error detection by an astigmatic method, a cylindrical lens or the like. The laser light from the composite lens 35 is separated by a polarization beam splitter 36 into the P-polarization component and the S-polarization component in accordance with the direction of polarization before being incident on photodetector elements 37 and 38. Since the phase difference between the P-and S- polarization components is already compensated by the phase compensation plate 32, signal detection by the photodetector elements 37 and 38 and, above all , signal detection by the Kerr effect may be achieved satisfactorily.

Figure 9:
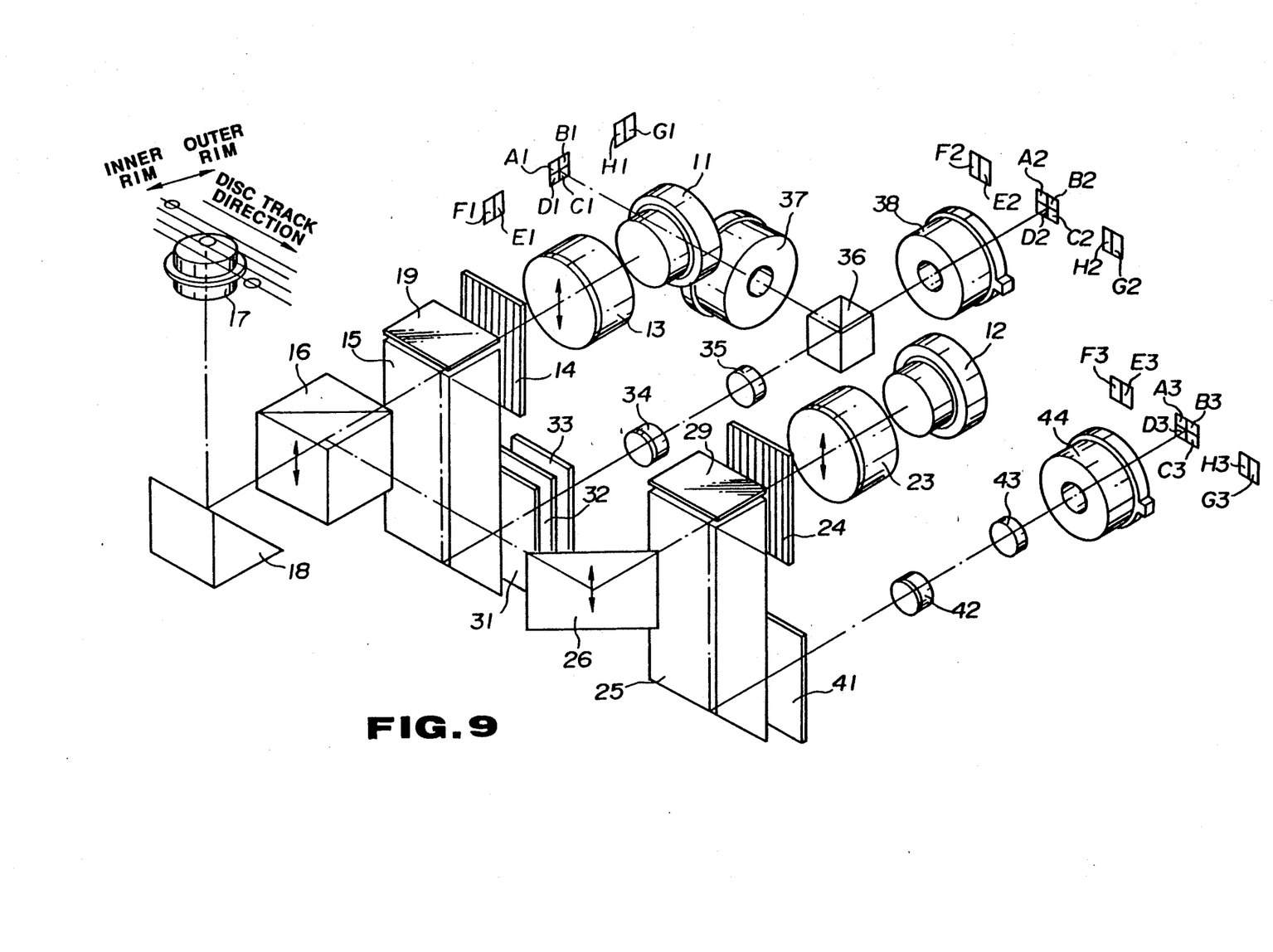
FIG. 9 is an exploded schematic perspective view showing an arrangement of an optical pickup device for a recordable disc according to an embodiment of the present invention.

FIG. 9 shows, in a schematic perspective view, a specific example of the arrangement of optical components in the optical system shown in FIG. 1 in which segmented light receiving sections within the interior of the photodetector elements 37 and 38 are also shown. Specifically, the light receiving section of the IN photodetector element 37 is constituted by four central segments A1 to D1, two segments E1 and F1 for the leading side of the track and two segments G1 and H1 for the trailing side of the track. Similarly, the light receiving section of the photodetector element 38 is constituted by four central segments A2 to D2, two segments G2 and H2 for the leading side of the track and two segments E2 and F2 for the trailing side of the track. By output signals from these segments, a variety of signals, such as focusing OK signal A1+B1+C1+D1, focusing error signal (A1+C1−(B1+D1))−(A2+C2−(B2+D2)), a leading push-pull signal E1−F1, a trailing push-pull signal G1−H1, tracking error signal A1+D1 (B1+C1)−α((F-

1−E1)+(H1−G1)), a preceding pit signal (E1+F1)+(G2+H2), a preceding magneto-optical (MO) signal (E1+F1)−(G2+H2), a succeeding pit signal (G1+H1)+(E2+F2) or a succeeding magneto-optical (MO) signal (G1+H1)−(E2+F2), may be produced.

The laser light with the wavelength of 830 nm, reflected by the dichroic mirror 16, is reflected by a driving mirror 26 before being incident on the beam splitter 25. The laser light is reflected by reflecting surfaces within the beam splitter 25 twice in the present embodiment. The driving mirror 26, which may be a so-called galvano-mirror, is used for adjusting the relative disposition of the light spots $S_R$, $S_{R+}$ and $S_{R-}$ by the reading laser light of the wavelength of 780 nm and tie light spots $S_W$, $S_{W+}$ and $S_{W-}$ by the writing laser light of the wavelength of 830 nm. The laser light from the beam splitter 25 is incident on a condenser lens 42 and thence on a composite lens 43, if necessary by means of an interference filter 41. If the dichroic mirror 16 having the optical characteristics shown in FIGS. 7 and 8 is used, the interference filter 41 may be eliminated to simplify the construction. The composite lens 43 may be composed of a concave lens for focusing error detection by an astigmatic method, a cylindrical lens or the like. The laser light from the composite lens 43 is incident on a photodetector element 44.

The light receiving section within the photodetector element 44 is of a segmented structure shown for example in FIG. 9, and is constituted by four central segments A3 to D3, two segments G3 and H3 for the leading side of the track and two segments E3 and F3 for the trailing side of the track. By output signals from these segments, a push-pull signal (A3+D3)−(B3+C3) and a tracking error signal A3+D3−(B3+C3)−((F3−E3)+(H3−G3)) for the optical system of the wavelength of 830 nm are produced.

By the above pushpull signal for the optical system for the wavelength of 830 nm, address data recorded by track wobbling may be found. The driving mirror 26 is driven so that the difference between the absolute address of the write spot position and the absolute address of the address data based on the preceding pushpull signal of the wavelength of 780 nm is controlled to be a predetermined value, three in the present embodiment. The driving mirror may also be so driven that the equation of the absolute address based on the succeeding pushpull signal with the wavelength of 780 nm may be achieved. Meanwhile, if the address data is recorded in the form of pits, address data of the recording position is obtained by a sum signal (A3+B3+C3+D3), so that this address data may be compared to the address data based on the preceding pit signal or the succeeding pit signal of the wavelength of 780 nm to effect driving control of the driving mirror 26. If a tracking servo is energized in which the tracking error based on the laser light spot of the wavelength of 780 nm is reduced to zero, a tracking servo in which the laser light spot $S_W$ is to be disposed at the center of the track may be achieved by supplying a tracking control signal based on the tracking error signal of the optical system for the wavelength of 830 nm to the driving mirror 26 and driving the driving mirror 26 within the extent of $\pm \frac{1}{2}$ track so that the tracking error will be reduced to zero.

Meanwhile, the phase compensation plate may be omitted or eliminated by providing a phase compensation film on the inclined reflective end face of the beam splitter 15, adjusting the phase film of the wavelength separating film surface of the beam splitter 15 or by adjusting a phase film on the reflective surface of the 45° mirror 18. If the return light beam of the optical system for the wavelength of 780 nm is constituted by the transmitting side of the beam splitter 15, it naturally becomes unnecessary to take account of phase shifting produced by reflection at the inclined end face of the beam splitter 15.

Meanwhile, a photodetector 19 provided on an end face of the beam splitter 15 and a photodetector 29 provided on an end face of the beam splitter 25 are used as light volume detection means for so-called APC for automatically controlling the power of the laser light sources 11 and 12, respectively.

The basic concept of the preceding embodiment may be summarized in the following manner.

The first laser light source 11 radiates a reading laser light with a first wavelength of 780 nm, while the second laser light source 12 radiates a recording laser light with a second wavelength of 830 nm. These laser light beams with the different wavelengths are synthesized by the dichroic mirror 16 and irradiated on the magneto-optical disc 20 as a recordable disc, while the light reflected by the disc 20 is separated by he dichroic mirror 16 into a laser beam with the wavelength of 780 nm and a laser beam with a wavelength of 830 nm. In respect of one of the return laser light beams from the dichroic mirror 16, that is, the laser light with the wavelength of 780 nm, the phase difference between the P-polarization component and the S-polarization component is compensated by the Phase compensation plate 32. The laser light from the phase compensation plate 32 is separated by polarization beam s litter 36 into the P-polarization component and the S-polarization component which are then transmitted to and received by the photodetector elements 37 and 38.

The dichroic mirror 16 has preferably such transmittance characteristics that the difference between the minimum transmittance in the working range of the laser light of the first wavelength of 780 nm and the maximum transmittance in the working range of the laser light of the second wavelength of 830 nm is 90% or higher for reducing changes in the phase difference between the P-, and S-polarization components.

In this manner, the phase difference between the P- and S-polarization components at the photodetector elements 37 and 38 may be reduced to zero, while high wavelength separation at the dichroic mirror 16 is maintained, thereby producing satisfactory signals.

It is to be noted that the present invention is not limited to the above embodiments. For example, the first and second wavelengths may be set to any arbitrary values, and the laser light with the first wavelength may be used for recording while the laser light with the second wavelength may be used for reading. The construction of the optical system may also be modified optionally. For example, the beam splitters 15 and 25 may be cyboid and the light-radiating side and the light-receiving side of the optical path may be arranged at right angles to each other. The driving mirror 26 may also be arranged in the light path of the reading optical system, while the recording Side grating 24 may also be omitted. Such dichroic mirror 16 may also be employed in which the transmitted light becomes the recording laser light and the reflected light becomes the reading laser light. The recordable disc is not limited to a magneto-optical disc, and the dichroic mirror may be used in a variety of optical pickup devices.

What is claimed is:

1. An optical pickup apparatus for a recordable disc, said apparatus comprising:

a first laser light source for radiating a laser light having a first wavelength;

a second laser light source for radiating a laser light having a second wavelength, dichroic mirror means for synthesizing the laser lights from said first and second laser light sources so as to form a synthesized laser light and for irradiating said recordable disc with said synthesized laser light, said dichroic mirror means separating a return light from said disc into a first return light having said first wavelength and a second return light having said second wavelength, phase compensation means for compensating a phase difference between a P-polarization component and an S-polarization component of at least one of said first and second return lights produced by said dichroic mirror, a polarization beam splitter for separating a phase difference compensated laser light from said phase compensation means into a P-polarization component and an S-polarization component, and light receiving means for receiving the P-polarization component and the S-polarization component from said polarization beam splitter.

2. In an optical pick-up apparatus for use with a recordable disc having first and second laser light sources for radiating first and second laser light beams having first and second wavelengths, respectively, the combination of:

dichroic mirror means for separating a received light beam into a first received laser light beam having the first wavelength and a second received laser light beam having the second wavelength, said dichroic mirror means having transmittance characteristics such that a difference between a minimum transmittance in a first working range associated with the first wavelength and a maximum transmittance in a second working range associated with the second wavelength is at least 90%; and phase compensation means for reducing a phase difference between a P-polarization component and an S-polarization component of at least one of the first and second received laser light beams produced by said dichroic mirror means.

* * * * *